(12) United States Patent
Browne et al.

(10) Patent No.: US 7,937,313 B2
(45) Date of Patent: May 3, 2011

(54) METHOD AND SYSTEM FOR STRESS TESTING SIMULATIONS OF THE BEHAVIOR OF FINANCIAL INSTRUMENTS

(75) Inventors: Sid Browne, Brooklyn, NY (US); Arthur Maghakian, New York, NY (US)

(73) Assignee: Goldman Sachs & Co., New York, NY (US)

( * ) Notice: Subject to any disclaimer, the term of this patent is extended or adjusted under 35 U.S.C. 154(b) by 2371 days.

(21) Appl. No.: 10/159,447

(22) Filed: May 31, 2002

(65) Prior Publication Data

US 2003/0018456 A1   Jan. 23, 2003

Related U.S. Application Data

(63) Continuation-in-part of application No. 09/896,488, filed on Jun. 29, 2001, now Pat. No. 7,149,715.

(51) Int. Cl.
*G06Q 40/00* (2006.01)

(52) U.S. Cl. ............... 705/37; 705/35; 705/36; 705/38

(58) Field of Classification Search .............. 705/35–38, 705/1, 34
See application file for complete search history.

(56) References Cited

U.S. PATENT DOCUMENTS 5,812,988 A * 9/1998 Sandretto .................... 705/36 R
5,819,237 A   10/1998 Garman
5,930,762 A    7/1999 Masch (Continued)

FOREIGN PATENT DOCUMENTS

JP   2002288436 A   10/2002

OTHER PUBLICATIONS

Using the financial markets to hedge the risk of unemployment in the offering of a private unemployment insurance product by Haley, Joseph Donald, Ph.D., The University of Nebraska—Lincoln, 1990, 123 pages; AAT 9030121.*

(Continued)

*Primary Examiner* — Alexander Kalinowski
*Assistant Examiner* — Clement B Graham
(74) *Attorney, Agent, or Firm* — Walter G. Hanchuk; Chadbourne & Parke LLP

(57) ABSTRACT

A method and system for simulating changes in volatility for a price of a particular option on an underlying financial instrument is disclosed. A volatility surface model having at least one surface parameter is provided along with a set of volatilities for a plurality of options on the underlying financial instrument. The set of volatilities is analyzed to determine an initial value for each surface parameter which, when used in the surface model, defines a surface approximating the set of volatilities under normal market conditions. The values of the surface parameters are then evolved using an appropriate evolution function. Prior to applying the surface parameters to the model, the parameter values can be adjusted to introduce changes in offset, skew, term, or other parameters of the volatility surface to allow for simulation of unusual market conditions. A volatility value for a particular option is extracted from the volatility surface defined by the evolved and stress-adjusted surface parameter values. The extracted volatility value can then be used in an option pricing model to provide a price of the particular option.

14 Claims, 9 Drawing Sheets

U.S. PATENT DOCUMENTS

| | | | |
|---|---|---|---|
| 6,058,377 A | 5/2000 | Traub et al. | |
| 6,085,175 A | 7/2000 | Gugel et al. | |
| 6,122,623 A | 9/2000 | Garman | |
| 6,546,375 B1* | 4/2003 | Pang et al. | 705/37 |
| 7,233,921 B2* | 6/2007 | Takeda et al. | 705/36 R |
| 2001/0034686 A1* | 10/2001 | Eder | 705/36 |
| 2003/0083973 A1* | 5/2003 | Horsfall | 705/37 |
| 2004/0039673 A1 | 2/2004 | Amberson et al. | |

OTHER PUBLICATIONS

Emanuel Derman, Iraj Kani and Joseph Z. Zou, "The Local Volatility Surface", Quantitative Strategies Research Notes, Dec. 1995, pp. 1-28.

John Hull and Alan White, "Incorporating Volatility Updating Into The Historical Simulation Method For Value-At-Risk", The Journal of Risk, 1998, vol. 1, No. 1, pp. 4-19.

* cited by examiner

Fall 1998 SPX Call Implied Volatility Surface

Post stress event

Pre stress event

Spring 2000 Implied Volatility Surface

Pre stress event

Post stress event

Spring 2000 Implied Volatility Surface

Pre stress event

Post stress event

Fig. 9

METHOD AND SYSTEM FOR STRESS TESTING SIMULATIONS OF THE BEHAVIOR OF FINANCIAL INSTRUMENTS

CROSS-REFERENCE TO RELATED APPLICATIONS

This application is a continuation-in-part of U.S. patent application Ser. No. 09/896,488 filed on Jun. 29, 2001 now U.S. Pat. No. 7,149,715 and entitled "Method and System for Simulating Volatility Surfaces for Use in Option Pricing Simulations."

FIELD OF THE INVENTION

This invention is related to a method and system for stress testing simulations of financial instrument behavior by varying components of an evolving volatility surface for the instruments at issue.

BACKGROUND

A significant consideration which must be faced by financial institutions (and individual investors) is the potential risk of future losses which is inherent in a given financial position, such as a portfolio. There are various ways for measuring potential future risk which are used under different circumstances. One commonly accepted measure of risk is the value at risk ("VAR") of a particular financial portfolio. The VAR of a portfolio indicates the portfolio's market risk at a given percentile. In other words, the VAR is the greatest possible loss that the institution may expect in the portfolio in question with a certain given degree of probability during a certain future period of time. For example, a VAR equal to the loss at the $99^{th}$ percentile of risk indicates that there is only a 1% chance that the loss will be greater than the VAR during the time frame of interest.

Generally, financial institutions maintain a certain percentage of the VAR in reserve as a contingency to cover possible losses in the portfolio in a predetermined upcoming time period. It is important that the VAR estimate be accurate. If an estimate of the VAR is too low, there is a possibility that insufficient finds will be available to cover losses in a worst-case scenario. Overestimating the VAR is also undesirable because funds set aside to cover the VAR are not available for other uses.

To determine the VAR for a portfolio, one or more models which incorporate various risk factors are used to simulate the price of each instrument in the portfolio a large number of times using an appropriate model. The model characterizes the price of the instrument on the basis of one or more risk factors, which can be broadly considered to be a market factor which is derived from tradable instruments and which can be used to predict or simulate the changes in price of a given instrument. The risk factors used in a given model are dependent on the type of financial instrument at issue and the complexity of the model. Typical risk factors include implied volatilities, prices of underlying stocks, discount rates, loan rates, and foreign exchange rates. Simulation involves varying the value of the risk factors in a model and then using the model to calculate instrument prices in accordance with the selected risk factor values. The resulting price distributions are aggregated to produce a value distribution for the portfolio. The VAR for the portfolio is determined by analyzing this distribution.

A particular class of instrument which is simulated is an option. Unlike simple securities, the price of an option is dependant upon the price of the underlying asset price, the volatility of changes in the underlying asset price, and possibly changes in various other option parameters, such as the time for expiration. (The price dependencies for other derivative instruments can be similarly complex.) An option can be characterized according to its strike price and the date it expires. The volatility of the option price is related to both of these factors. Sensitivity of the option volatility to these effects are commonly referred to as skew and term. Measures of the volatility for a set of options can be combined to produce a volatility surface. For example, FIG. 1 is a graph of the implied volatility surface for S&P 500 index options on Sep. 27, 1995 as a function of strike level and term to expiration.

The volatility surface can be used to extract volatility values for a given option during simulation. The extracted volatility value is applied to an option pricing model which provides simulated option prices. These prices can be analyzed to make predictions about risk, such as the VAR of a portfolio containing options. The volatility surface is not static, but changes on a day-to-day basis. Thus, in order to make risk management decisions and for other purposes, changes in the volatility surface need to be simulated as well.

Various techniques can be used to simulate the volatility surface over time. In general financial simulations, two simulation techniques are conventionally used: parametric simulation and historical simulation. Variations of these techniques can be applied to simulate volatilities.

In a parametric simulation, the change in value of a given factor is modeled according to a stochastic or random function responsive to a noise component $\epsilon$. During simulation, a suitable volatility surface can be used to extract a starting volatility value for the options to be simulated and this value then varied in accordance with randomly selected values of noise over the course of a simulation.

Although parametric simulation is flexible and permits the model parameters to be adjusted to be risk neutral, conventional techniques utilize a normal distribution for the random noise variations. As a result, probability distribution "fat-tails" which occur in real life must be explicitly modeled to compensate for the lack of this feature in the normal distribution. In addition, cross-correlations between various factors must be expressly represented in a variance-covariance matrix. The correlations between factors can vary depending on the circumstances and detecting these variations and compensating for them is difficult and can greatly complicate the modeling process. Moreover, the computational cost of determining the cross-correlations grows quadratically with the number of factors making it difficult to process models with large numbers of factors.

An alternative to parametric simulation is historical simulation. In a historical simulation, a historical record of data is analyzed to determine the actual factor values and these values are then selected at random during simulation. This approach is extremely simple and can accurately capture cross-correlations, volatilities, and fat-tail event distributions. However, this method is limited because the statistical distribution of values is restricted to the specific historical sequence which occurred. In addition, historical data may be missing or non-existent, particularly for newly developed instruments or risk factors, and the historical simulation is generally not risk neutral.

In addition to typical simulation based on an analysis of normal market performance, it is often useful to "stress test" a simulation model to determine the effect of very rare market occurrences on, e.g., the behavior of a portfolio. The events modeled during stress testing are atypical and it is generally not desired to represent them in the distribution of values used during a normal simulation process.

In a conventional method, the value of a market observable variable is changed by some large amount and than the impact of this change on the portfolio is simulated. The value of risk factors, such as implied volatility, can also be adjusted upwards or downwards by some amount. Multiple scenarios, typically chosen arbitrarily and from historical data gathered over 10 to 20 years, are often used to determine the reaction of a portfolio to such rare events. For example, a simulation could introduce a drop in the value of the S&P 500 and an increase in the implied volatility as observed for "Black Monday" of October, 1987 to determine the effect of a similar market on a portfolio at issue.

Although such conventional simulation techniques provide some insight into portfolio performance, the manner in which the volatility is adjusted is simplistic. In particular, conventional stress testing adjusts the value of all points on the respective implied volatility surface in parallel, raising or lowering the volatility surface by some fixed amount. In many situations, however, the actual behavior of the volatility surface is more complex. For example, the volatility of an option on a security may increase significantly for short term options but only a small degree for long term options.

Because conventional stress testing makes only gross changes to the surface values as a whole, scenarios like those in the example are modeled improperly and the simulation can over or underestimate significant amounts of risk.

Accordingly, there is a need to provide a better way to represent changes in implied volatility and other risk factors during stress test simulation of a portfolio.

SUMMARY OF THE INVENTION

These and other needs are met by a simulation methodology according to the present invention wherein option volatility is represented by a parameterized volatility surface model, an example of which is discussed herein as a surface defined by a series of surface parameters $\beta$. In a particular embodiment, volatility is specified relative to $\Delta$ and T values for an associated option and the surface model has surface parameters $\beta_0 \ldots \beta_n$, $n \geq 0$ such that the surface model is of the form:

$$\sigma_i(\Delta, T) = F(\beta_{0,i}, \ldots, \beta_{n,i}, \Delta, T)$$

where $\sigma$ is a measure of the volatility for an option with a given $\Delta$ and T, and F is a function of $\Delta$, T and the surface parameters $\beta_0 \ldots \beta_n$. A preferred form of the surface parameterization is:

$$\ln \sigma(\Delta, T) = \beta_0 + \beta_1(\Delta - x_1) + \beta_2(T - x_2)^+ + \beta_3(T - x_3)^+$$

where $x_1$, $x_2$, and $x_3$ are constant terms.

The initial values of the surface parameters can be determined by regressing a set of initial option volatility data relative to expiration time vs. delta or other appropriate axes. The model can be calibrated to determine the offset of the starting option volatilities from the value provided by the initial surface model. During normal processing, at each "tick" of the simulation, the beta parameter values defining the volatility surface can be adjusted according to a function which provides a next beta value based upon the present beta value and a noise-varying measure of the beta volatility.

During stress testing, the beta values can be further adjusted on an individual basis to reflect various market conditions. Thus, in addition to introducing parallel shifts to the volatility surface, the surface parameters can be altered to change the skew, term, or another aspect of the volatility surface to more accurately reflect the conditions during rare historical events or to test other complex market conditions. The adjustment to the beta values during stress testing can be done on an individual or ad-hoc basis or the stress testing adjustments to beta can be included in the next-beta functions. In an alternative embodiment, the beta surface parameters are calculated normally and additional stress values are introduced when the beta parameters are used to generate the surface for simulation.

The beta volatility can be determined by analyzing a time-series of beta values from volatility surfaces derived using historical data or estimated through other means. The new beta parameter values are then applied to the surface model to define a simulated volatility surface. This surface can then be used to extract a volatility value for an option during simulation. The extracted value is adjusted in accordance with the calibration data and the calibrated simulated volatility value is applied to the pricing model.

Various techniques can be used to simulate the noise-varying volatility of the beta parameters. Preferably, and according to a further aspect of the invention, the noise variations in the beta volatility are selected from a set of risk-neutral bootstrapped residual values generated through analysis of a time-varying sequence of beta values from volatility surfaces fit to historical data.

BRIEF DESCRIPTION OF THE FIGURES

The foregoing and other features of the present invention will be more readily apparent from the following detailed description and drawings of illustrative embodiments of the invention in which:

FIGS. 8 and 9 illustrate implied volatility surfaces for IBM and Cisco Systems, respectively, before and after an extreme market event occurring in the Spring of 2000.

DETAILED DESCRIPTION OF THE PREFERRED EMBODIMENTS

The present invention is directed to an improved technique for simulating the time-evolution of a risk factor value which is dependant upon two or more variables. A particular aspect of the invention allows improved increased control over the value of the risk factor to permit more accurate stress testing of portfolios or other financial objects. The disclosure will first address simulation of the performance of derivative instruments with a risk factor dependant upon multiple factors, and, in particular, the volatility surface for options. Use of the disclosed techniques to stress test the behavior of a portfolio containing the modeled options will then be discussed.

Option prices have a volatility that is dependant upon both the price of the underling security and the time remaining before the option expires. The volatility for the various options which derive from a given security can be represented as a volatility surface. The present methods provide an improved technique for simulating the evolution of the volatility surface for use in, e.g., risk analysis simulations. The methodology can be applied to other types of derivative instruments and more generally to simulation models which have risk factors dependant upon multiple factors which can be modeled as "multi-dimensional surfaces", such as volumes, or higher dimensional constructs.

An option can be characterized according to its strike price and the date it expires and the volatility of the option price is related to both of these factors. The ratio between the change in option price P and the security price S is conventionally expressed as "delta":

$$\Delta = \frac{\partial P}{\partial S} \quad \text{(Equ. 1)}$$

One method of specifying a volatility surface is with reference to delta vs. the term T remaining for an option, e.g., $\sigma(T,\Delta)$. The use of delta provides a dimensionless value which simplifies comparisons between different options. However, other variables for the surface $\sigma(x,y)$ can be alternatively used.

Figure 1:
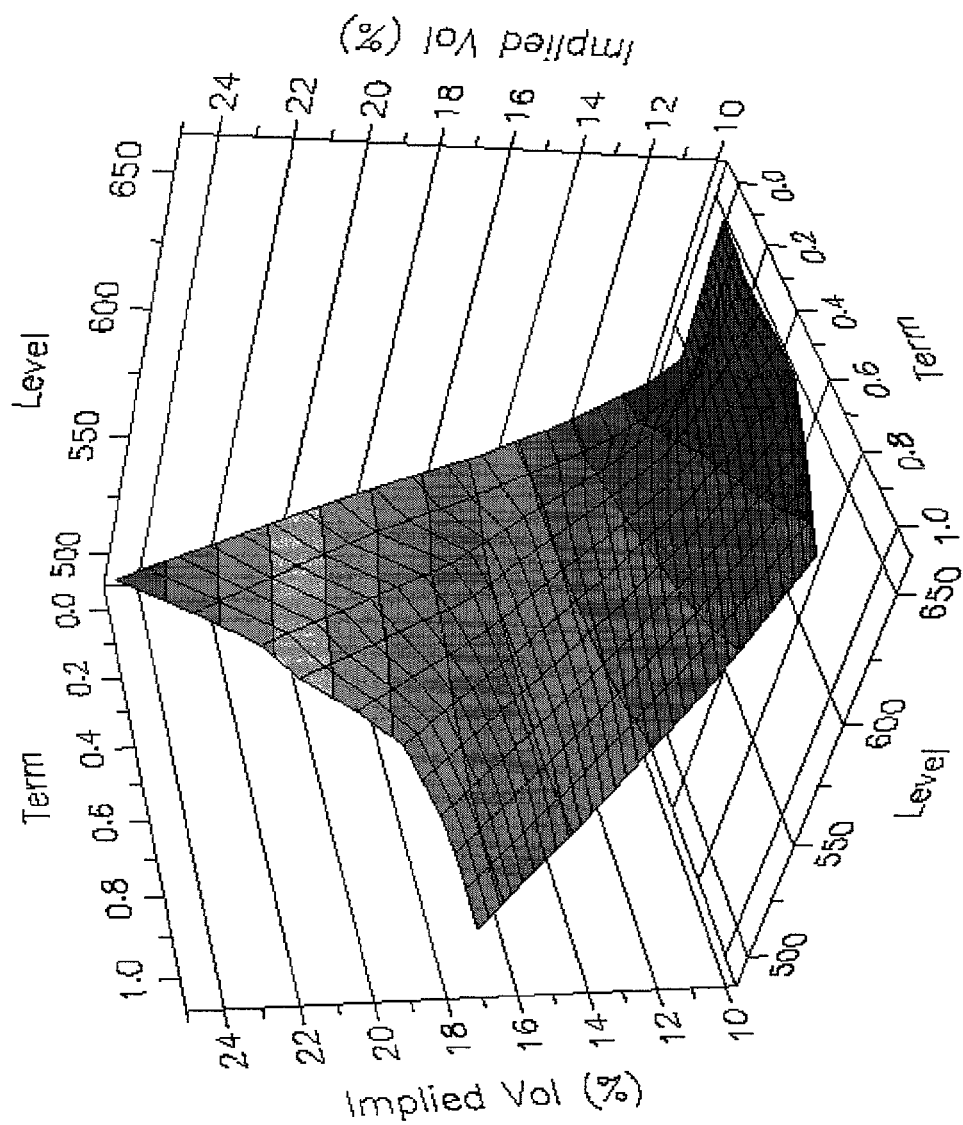
FIG. 1 is a graph of a sample volatility surface.
Figure 2:
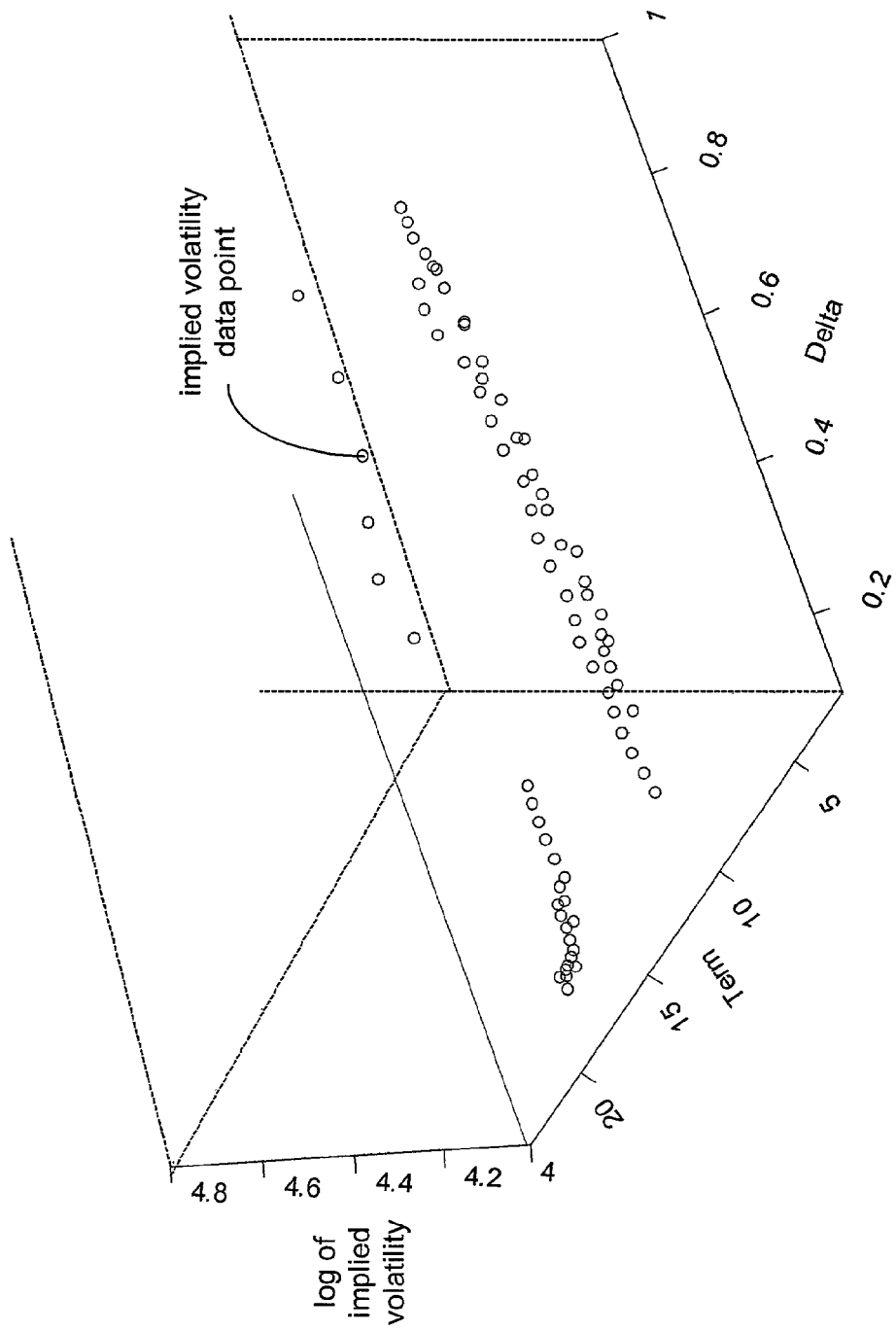
FIG. 2 is a graph of a set of volatility points for various options plotted against the corresponding term (T) and delta ($\Delta$) axes.

Initially, historical data for options of a given security is analyzed to determine (or otherwise select) an implied volatility $\sigma_{imp}$ for each option of interest at a starting point of the simulation, e.g., beginning from the most recent closing prices. The volatility points $\sigma_{imp}(T,\Delta)$ for the various options define a set of values which can be plotted against the corresponding T and delta axes. A sample plot is illustrated in FIG. 2.

According to one aspect of the invention, a parameterized volatility surface providing a measure of the implied volatility $\sigma_i$ for a given delta and T at a time index i, is defined as a function F of one or more surface parameters $\beta_{0,i} \ldots \beta_{n,i}$, delta, and T:

$$\sigma_i(\Delta,T) = F(\beta_{0,i}, \ldots, \beta_{n,i}, \Delta, T) + e_i(\Delta,T) \quad \text{(Equ. 2)}$$

As will be appreciated, various scaling functions can be applied to the value of $\sigma_i$. The error or noise term $e_i$ is not technically a component of the volatility surface model itself but is shown herein to indicate that the modeled surface may only be an approximation of the volatility values.

Figure 3:
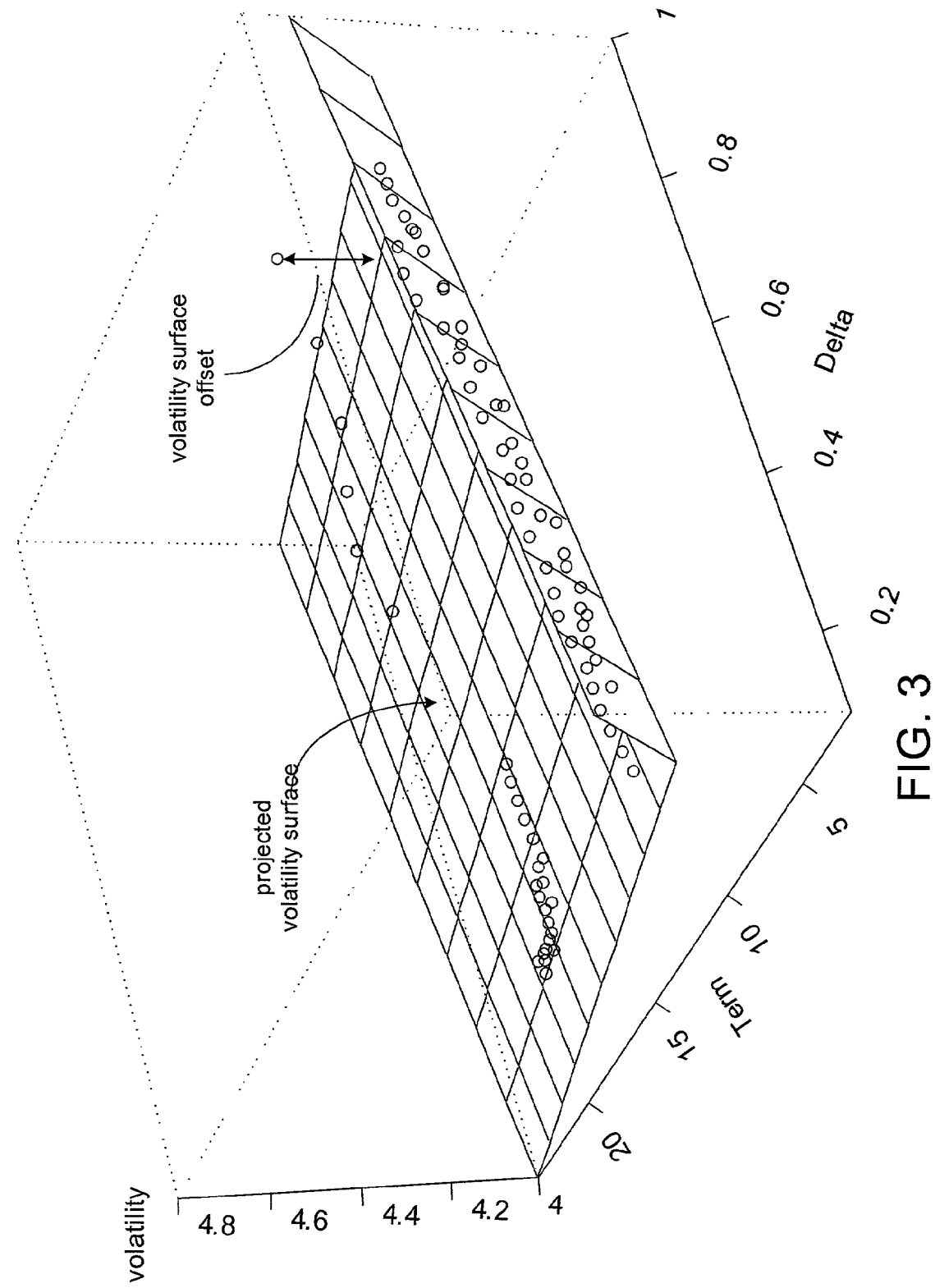
FIG. 3 shows an implied volatility surface determined for the set of volatility data points of FIG. 2.

Prior to simulation, values for the parameters, $\beta_0 \ldots \beta_n$ are determined to define a volatility surface (via the volatility surface model) which approximates the historical volatility data from a given time index. Suitable values can be determined using an appropriate regression analysis. The residual factor $e_i(\Delta,T)$ can be defined for at least some of the option points used to determine the surface parameter values as an offset of the source volatility point from the corresponding point on the modeled volatility surface. FIG. 3 shows an implied volatility surface determined in accordance with Equation 5 (discussed below) from a regression of the set of volatility data points of FIG. 2. The residual offset values can be subsequently used to calibrate or adjust volatility values which are extracted from the modeled volatility surface.

The form of the surface parameterization function and the number of different $\beta$ parameters can vary depending on implementation specifics. Greater numbers of surface parameters can provide a surface that more closely fits the sample points but will also increase the complexity of the model. The presence of additional parameters also allows specific attributes of the volatility surface, such as skew, to be precisely varied during stress testing without effecting other attributes of the surface.

Preferably, the implied volatility surface is defined with reference to the log of the implied volatility values and is a linear or piecewise linear function having at least one constant or planar term, one or more linear or piecewise linear parameter functions of delta, and one or more linear or piecewise linear parameter functions of T. A most preferred form of the surface parameterization function, in which the volatility value is scaled according to a log function, is:

$$\ln \sigma(\Delta,T) = \beta_{0,i} + \beta_{1,i}(\Delta-x_1)^+ + \beta_{2,i}(T-x_2)^+ + \beta_{3,i}(T-x_3)^+ + e_i(\Delta,T) \quad \text{(Equ. 3)}$$

where $(x)^+$ is a piecewise linear function equal to x where x>0 and otherwise equal to zero, $e_i(\Delta,T)$ is a residual noise factor, and $x_1, x_2,$ and $x_3$ are constant terms having values selected as appropriate to provide an acceptable surface fit to the historical data in accordance with user preferences and other criteria.

Suitable values for $x_1, x_2,$ and $x_3$ can be determined experimentally by applying the simulation technique disclosed herein using different values of $x_1 \ldots x_3$ and then selecting values which provide the most accurate result. A similar technique can be used to select appropriate surface parameterizing functions for the simulation of other risk factors characterized by multiple variables. In a specific implementation, the following values have been found to provide very suitable results:

$$\ln \sigma_i(\Delta,T) = \beta_{0,i} + \beta_{1,i}(\Delta-0.5) + \beta_{2,i}(T-4)^+ + \beta_{3,i}(T-24)^+ + e_i(\Delta,T) \quad \text{(Equ. 4)}$$

with the values of T specified in months. Variations in the specific values used and the form of the equation can be made in accordance with the type of security and risk factor at issue as well as various other considerations which will be recognized by those of skill in the art.

Depending upon the type of derivative value at issue and the data available, conversions or translations of derivative characteristics might be required prior to using that data in the surface-defining regression. In addition, some decisions may need to be made regarding which data values to use during the regression. Preferably, a set of predefined guidelines is used to determine how the values of the implied volatilities which are regressed to derive the surface parameters are selected and also to identify outlying or incomplete data points which should be excluded from the regression.

According to a particular set of guidelines, for each underlier, the implied volatilities used in the analysis can be selected using following rules:

For each exchange traded European option on the underlier, closing bid and ask implied volatilities along with corresponding delta and term are identified Deltas of implied volatilities for puts are converted to the deltas of calls using put-call parity Implied volatilities with missing bid or ask or volatilties with delta <0.15 or delta> 0.85 are excluded Average of bid-ask spread is used as data point For underliers without exchange tradable options, implied volatilities of OTC options marked by traders are used As those of skill in the art will recognize, other sets of guidelines can alternatively be used depending upon the circumstances, the instruments at issue, and the variables against which the volatility values are plotted to define the surface.

After the initial surface parameters β for the surface volatility model are determined, the model can be used to simulate changes in option price volatility by evolving the values of the beta surface parameters during simulation and applying the simulated β values to the surface parameterization function to define a corresponding simulated volatility surface. The implied volatility of an option during simulation can be determined by referencing the simulated volatility surface in accordance with the values of T and delta for that option at that point in the simulation.

Although a typical regression analysis can produce a surface which matches the source data points fairly well, as seen in FIG. 3. However, many of the actual implied volatilities which are used to determine the surface parameters may not fall on the parameterized surface, but instead are offset from it by a certain residual amount. Accordingly, after the volatility surface is beta-parameterized and simulated, it can be recalibrated back to the actual implied volatilities by determining the residual offset $e_i(\Delta,T)$ from the parameterized surface for at least some of the source volatility points.

To extract the implied volatility for an individual option during simulation, the simulated price of the underlying security and the time before the option expires are used to determine a point on the simulated volatility surface (generated using the simulated surface parameter values). The residual offset for that point is then calculated with reference to the calibration data, for example, by interpolating from the nearest neighbor calibration points. The value of the volatility surface point adjusted by the interpolated residual offset can then be applied to the simulation option pricing model. Although the changes in the calibration residuals could be analyzed and adjusted during the simulation process, preferably the calibration residuals are assumed to be constant in time for all generated scenarios.

Various techniques can be used to calculate the evolving values of the β parameters during simulation. Generally, the beta evolution function is a function g of one or more parameters $a_1 \ldots a_j$, a prior value of beta, and a corresponding noise component ϵ:

$$\beta_{m,i}=g(a_1, \ldots a_j, \beta_{m,i-1}, \epsilon_{m,i}) \quad \text{(Equ. 5)}$$

Preferably, the beta evolution function g is a linear mean-reversion process that provides a simulated time series of each individual beta parameter. A preferred form of the reversion providing a change in the beta value is:

$$\Delta\beta_{m,i}=\alpha_m(\theta_m-\beta_{m,i-1})+\upsilon_m\epsilon_{m,i} \quad \text{(Equ. 6)}$$

where α is a mean-reversion speed, θ is a mean for the $\beta_m$, υ is a value for the volatility of $\beta_m$, and ϵ is a random, pseudo-random, or other noise term.

The values of α, θ, and υ can be determined empirically, estimated, or through other means. A preferred method is to determine these values based upon historical analysis. In particular, historical data for various prior days i (or other time increment) is analyzed to generate a corresponding historical volatility surface having respective surface parameter values $\beta_{m,i}$. This analysis produces a time series of values for each surface parameter $\beta_m$. The time-varying sequence of $\beta_m$ is then analyzed to determine the corresponding historic mean $\theta_m$, mean-reversion speed $\alpha_m$, and mean reversion volatility $\upsilon_m$. These values can then be used in Equ. 6 to simulate future values of the respective $\beta_m$.

In some instances, there may be an insufficient number of implied volatility points to fully regress the set and determine appropriate values for each surface parameter. Various conditions specifying a minimum number of points and compensation techniques for situations with fewer points can be used. These conditions are dependant upon the characteristics of the surface parameterizing function and the number of beta parameters at issues.

According to a particular set of conditions which can be used in conjunction with a surface parameterization of the form shown in Equ. 3, above, at least 8 implied volatility points should be present to run a regression to determine the four beta parameters. These 8 volatilities should have at least 2 different deltas and one term longer than 10 months. In cases when these requirements are not met, the surface parameterization function can be simplified for the regression to reduce the number of betas. For example, when there is only one implied volatility point, only $\beta_0$, will be calculated and the values for the remaining betas can be set to the previous day's values. Other conditions can be specified for use when determining the parameters of the beta evolution function. For example, in a historical analysis using the mean reversion formula of Equ. 6, the mean reversion speed $\alpha_m$ can be set to 2 years if the calculated speed is negative.

Figure 4:
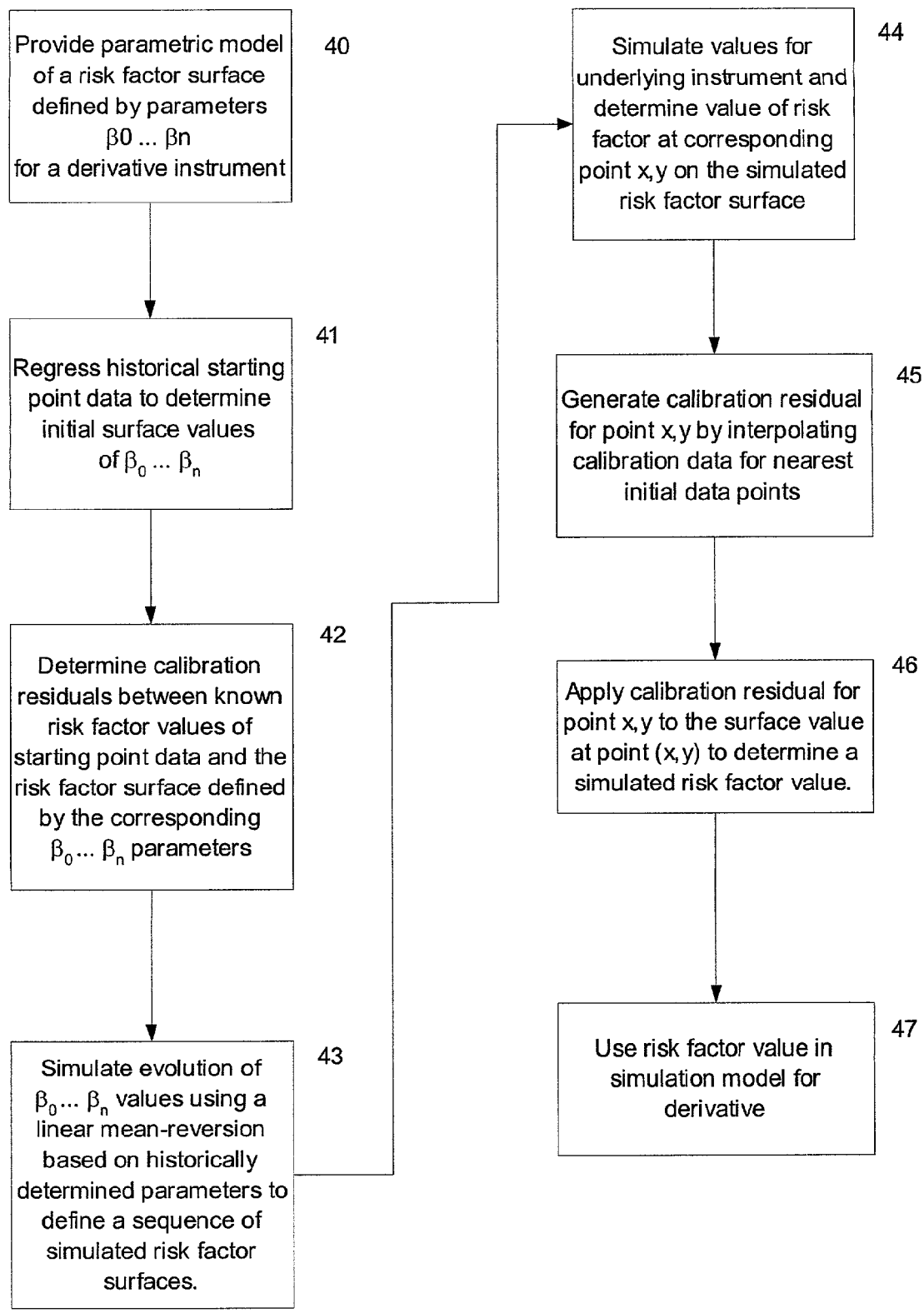
FIG. 4 is a flowchart of a method for simulating volatility surface evolution.

The method for simulating a risk factor surface according to the invention is summarized in the flowchart of FIG. 4. Initially a parametric model is selected which defines a risk factor surface according to a plurality of parameters $\beta_0 \ldots \beta_n$ (step 40). The values of the risk factor on a given day for a set of instruments derivative from a given security are regressed against the risk factor surface model to determine the starting values of the surface parameters $\beta_0 \ldots \beta_n$. (Step 41) A calibration residual which represents the difference between the source point value and the value indicated by the modeled surface is determined for at least some of the points used to define the starting surface parameters. (Step 42).

Next the evolution of each of the parameters $\beta_0 \ldots \beta_n$ is simulated using a beta-evolution function. The function is preferably a linear mean-reversion process based upon historically determined values, such as a historical average for beta, beta volatility, and mean reversion speed. (Step 43). The sequences of simulated $\beta_0 \ldots \beta_n$ in values define a simulated risk factor surface for each time index of each simulation run. The appropriate reference points from the simulation, such as the value of an underlying security and the delta for an option and the beta values are applied to the surface parameterization model to determine a corresponding risk factor value. (Step 44). A residual offset is determined for that point by applying the calibration data, for example via extrapolating from the calibration residual values of the nearest "real" points used during the calibration process (step 45) and this offset is applied to the risk factor value to calibrate it. (Step 46). The calibrated risk factor value is then used in the derivative pricing model, along with other data, to determine a simulated value of the derivative instrument. (Step 47).

Figure 5:
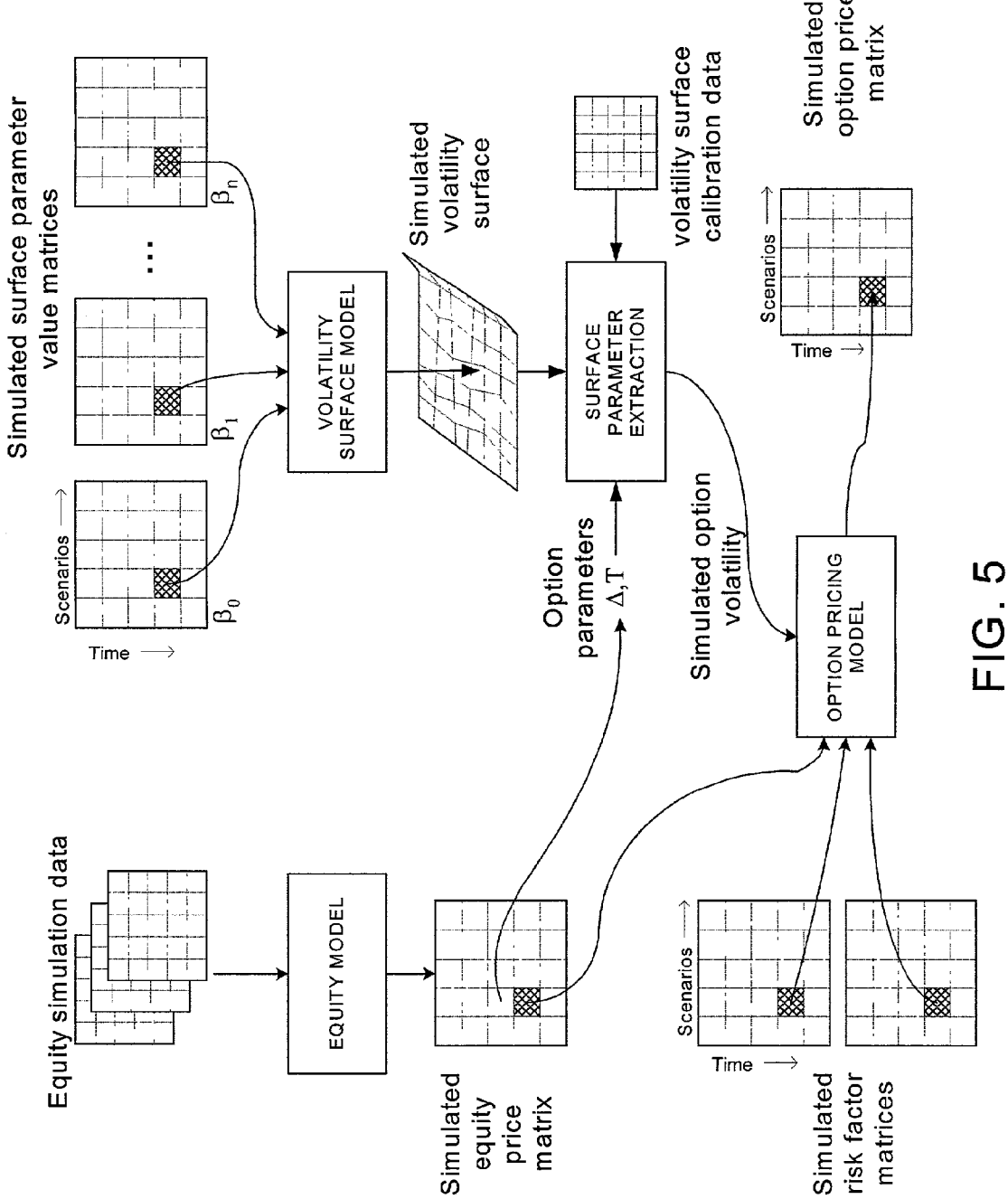
FIG. 5 is a flow diagram of a process for simulating option prices using an evolving volatility surface.

Simulation of the surface parameter values and various risk factors can be done on-the-fly during simulation. Preferably, however, the simulation is performed in two primary steps—risk-factor pre-simulation and model application. This embodiment is illustrated in FIG. 5.

Initially, all of the simulated beta factor values for each simulation "tick" of each simulation scenario are generated and stored in respective parameter value matrices. The simulated evolving values of other risk factors used in the option pricing model are also "pre-stimulated" and stored in a corresponding risk-factor matrices. Such risk factors can include, for example, simulated interest and loan rate values. In addition, because the option price is dependent upon the price of an underlying equity, the price of the underlying equity is also simulated using an appropriate equity model to provide a simulated equity price matrix.

After the surface parameters, risk factors, and equity prices, as well as other values which may be necessary are precalucated, the precalculated values are extracted synchronously across the various matrices and used to simulate the option price. In particular, for a given time index of a specific simulation run, the corresponding beta surface parameters are obtained from the surface parameter matrices. These values, when applied to the volatility surface model, define the simulated volatility surface.

The simulated equity price and relevant option parameters, such as Δ and T, are determined for the option being simulated, for example, with reference to the simulated equity price, prior simulated values for the option, and possibly other data. The Δ and T values (or other suitable values depending on the manner in which the volatility surface defined) are applied to the simulated volatility surface and the volatility value is obtained. This value is then adjusted in accordance with the volatility surface calibration data to provide a value for the simulated option volatility at that particular point of the simulation.

Finally, the simulated option volatility along with the appropriate risk factor values (extracted from the corresponding simulated risk factor matrices) are applied to the option pricing model to produce a simulated option price for the particular option at issue. This process is repeated for each step of each simulation run and the results are stored in a simulated option price matrix. When multiple options are to be simulated, the process is repeated for each option to generate corresponding simulated option pricing matrices.

A further aspect of the invention is directed to the manner in which the evolving beta values are determined. When a parametric mean-reversion or other beta-evolution function is used to simulate changes in the surface parameter values over time, appropriate values of the corresponding noise term $\epsilon_m$ must be selected. Preferably, the values of $\epsilon_m$ are selected from a predefined set of "historical" residual values. This set can be derived by solving the beta evolution function for a sequence of beta values generated from historic volatility data to determine the sequence of noise values which recreates the "historical" beta sequence. This historical bootstrapping technique is addressed in detail in U.S. patent application Ser. No. 09/896,660, filed Jun. 29, 2001 and entitled "Method And System For Simulating Risk Factors In Parametric Models Using Risk Neutral Historical Bootstrapping," the entire contents of which are hereby expressly incorporated by reference. The historical bootstrapping technique disclosed in this application can be applied to volatility surface modeling by treating the beta values as risk factors and the beta evolution equation as the corresponding parametric simulation model.

For the beta evolution function of Equ. 6, the historical sequences of $\beta_{m,i}$ as well as the derived values of the mean, mean reversion speed, and beta volatility are applied to the mean-reversion beta evolution function to produce a sequence of historical residual values according to:

$$\varepsilon_{m,i} = \frac{1}{\upsilon}(\beta_{m,i} - \alpha(\theta - \beta_{m,i-1})) \qquad \text{(Equ. 7)}$$

The values of the determined historical residuals $\epsilon_{m,i}$ can then used in the parametric beta evolution model during simulation in place of random noise component. Prior to simulation, the range of values of the historical residuals should be standardized to the range suitable for the corresponding random component in the model, typically such that the empirical average $E[\epsilon]=0$ and the variance $var[\epsilon]=1$. To preserve correlations which may exist between different sets of residuals from the historical sample, a linear standardization process can be applied to each residual value series to provide a corresponding standardized series:

$$\epsilon_{m,i}' = k_1 \epsilon_{m,i} + k_2 \qquad \text{(Equ. 8)}$$

where the values of $k_1$ and $k_2$ are selected to provide $E[\epsilon_i']=0$ and $var[\epsilon_i']=1$ for the given series of $\epsilon_{m,i}$ at issue (and may be different for different series). During simulation of the evolving values of beta, values of $\epsilon_{m,i}$ are selected, preferably at random, to be used in the beta-evolution function. To preserve cross-correlations between the beta values, a single random index value is generated and used to select the historical residual value from the set of residuals corresponding to each beta parameter.

After the sets of historical residuals for the beta values are generated, the sets can be further processed by applying one or more bootstrapping techniques to account for certain deficiencies in the source data, adjust the statistical distribution, increase the number of available samples, or a combination of these or other factors prior to simulation. To preserve correlations that may exist between the sequences of (standardized) historical residuals for each of the beta parameters, the same bootstrapping process should be applied to each historical residual sequence.

For example, during a simulation of a large number of scenarios, the number of historical residuals used will typically greatly exceed the actual number of samples calculated from the historically derived beta values. To increase the total number of historical residuals which are available, a multi-day bootstrap procedure can be used. A preferred bootstrapping technique is to sum a set of d randomly selected samples and divide by the square-root of d to produce a new residual value:

$$\varepsilon'' = \frac{\sum_{j=1}^{d} \varepsilon_j'}{\sqrt{d}} \qquad \text{(Equ. 9)}$$

This increases the total number of samples by a power of d (at the cost of reducing kurtosis, the fourth moment of the statistical distribution, for higher values of d). Preferably, a two-day bootstrapping is used. For a 250 day history, this process produces a sequence of up to 250*250=62,500 samples to draw on. Moreover, the low value of n=2 does not significantly reduce any fat-tail which may be present in the distribution.

Other pre-simulation bootstrapping procedures can be performed, such as symmetrizing the distribution of residuals to permit both increasing and decreasing beta value evolution if the source data provides betas which shift primarily in only one direction. A symmetrized set can be generated by randomly selecting two residual values i and j and combining them as:

$$\varepsilon'' = \frac{\varepsilon_i' - \varepsilon_j'}{\sqrt{2}} \qquad \text{(Equ. 10)}$$

Various other bootstrapping techniques known to those of skill in the art can also be used and more than one modification to the originally derived set of historical residuals can be performed prior to the simulation.

In addition to modeling the behavior of options under normal market conditions, e.g., as represented by the set of typical market conditions used to derive the parameters for a volatility surface, the surface can be further modified during a simulation to apply stress in order to model the effect of extreme or unusual market conditions on the performance of the option. Extreme or unusual market conditions, such as market "crashes", occur infrequently enough that they are often not represented in the data used for simulation of typical or normal behavior, either deliberately or because their effects are averaged out by the much larger pool of normal or typical data used to define the simulation parameters. Instead, the behavior of portfolios, for example, in response to actual or hypothetical unusual market conditions is typically modeled in a separate "stress test" simulation.

Figure 6:
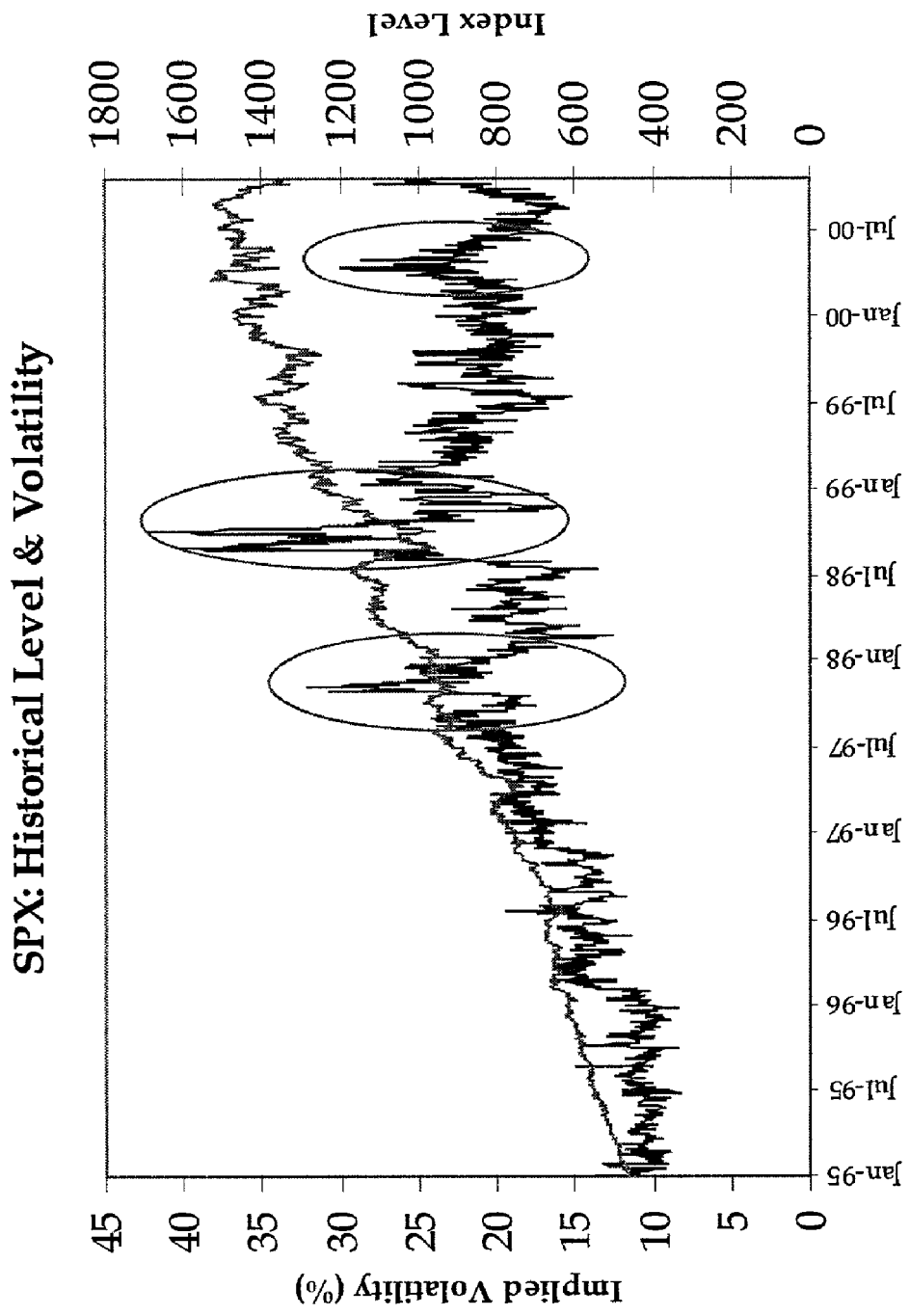
FIG. 6 is a graph of the S&P index level and the corresponding determined S&P implied volatility between January 1995 and July 2000 illustrating several extreme market events.

FIG. 6 is a graph of the historical level of the Standard & Poors™ index for a period between January, 1995 and July 2000 and a corresponding implied volatility for the index value. Three unusual or extreme market events are identified. As can be seen from the graph, while the changes in the index value during these periods are noticeable, the corresponding changes in volatility are dramatic.

During conventional stress testing, an assumption is made that changes in volatility during an extreme market event are consistent across the entire volatility surface and so all volatility values are changed by the same amount. In a typical simulation according to this convention, the normal volatility value is first determined for the option or other instrument at issue. Then, a constant stress offset is added to the determined volatility. If the volatilities used during such a simulation were viewed as a volatility surface, the conventional simulation would determine the volatility surface and then shift the entire surface upwards (or downwards) by some fixed amount. While this technique is simple, it does not accurately capture many other types of changes to the volatility surface which can occur during unusual market conditions.

According to a particular aspect of the invention, changes in the volatility surface can be introduced by adjusting the value of one or more beta parameters in the surface parameter model. Each beta value in the surface model is associated with one or more attributes of the surface, such as its vertical offset, skew, or term effect. By selectively varying one or more parameters of the surface model, different attributes of the volatility surface can be varied with substantially more control and accuracy than conventional stress testing techniques. Preferably, the adjustment is introduced after the beta parameters are determined (using, e.g., historical bootstrapping techniques), but prior to the evaluation of the surface itself. In one embodiment, one or more of the beta values which are generated for each scenario are modified before the surface model is used to extract volatility values.

For example, the surface parameterization equations shown in Equations 2-4, above, can be modified to allow various parameters to be stressed by providing that at least one parameter in the model as it is used during simulation is a function of the normal beta value and a stress beta value, e.g., $\beta_x = f(\beta_{x,normal}, \beta_{x,stress})$, $0 \leq x \leq n$. A preferred way to vary the value of the parameters is to add the normal and introduced stress beta values. However, they can also be combined using subtraction, multiplication, division, or by using other more complex functions.

The values of beta-stress added to the beta surface parameters during simulation can be constant terms selected for a particular simulation or can themselves be derived from respective equations. For example, a set of equations can be derived to calculate the appropriate beta-stress values to include in the simulation based on factors that define the type of unusual market conditions of interest. By specifying the factors to be used during a given stress simulation, the appropriate values of beta will be used. This is particularly useful for situations where an attribute of the volatility surface is dependent on more than one surface parameter and thus selection of the appropriate stress values to produce the market conditions of interest may not be trivial.

Figure 7:
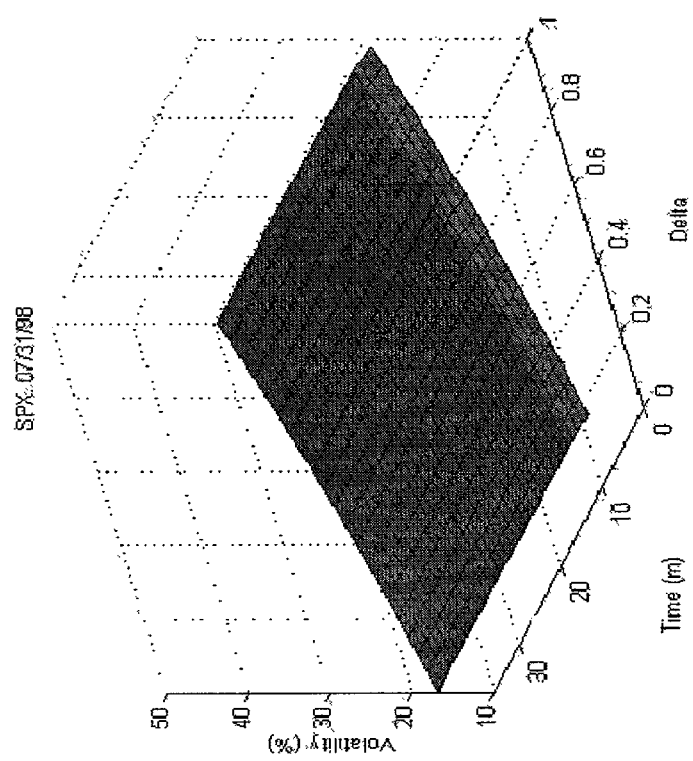
FIG. 7 illustrates implied volatility surfaces for S&P based options before and after an extreme market event occurring in the Fall of 1998.
Figure 7:
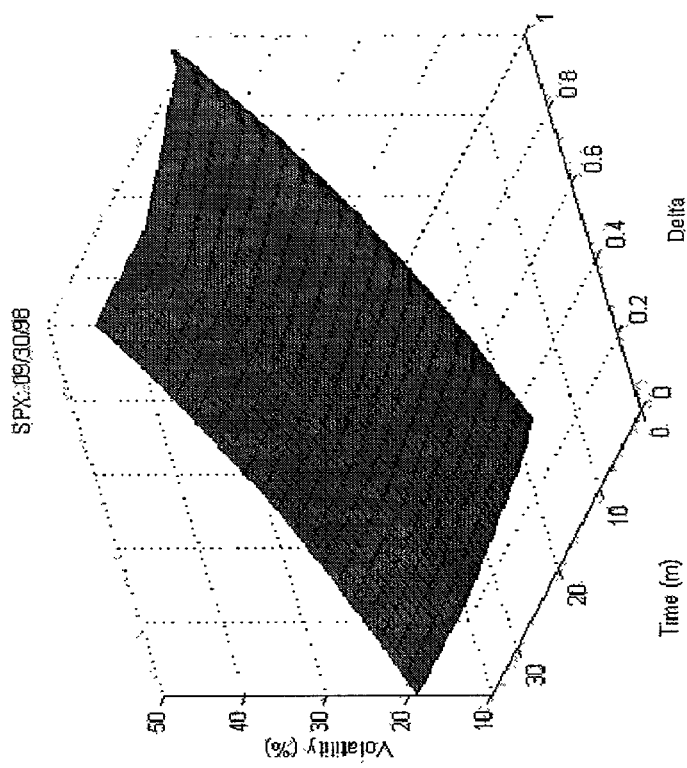

Turning to FIG. 7, there are shown two volatility surfaces representing options on the S&P on Jul. 31, 1998 and Sep. 30, 1998. With reference to the graph in FIG. 6, it can be seen that the right-hand graph in FIG. 7 corresponds with the unusual market conditions that were prevalent in the Fall of 1998. For low values of delta, the volatility surface has shifted upwards about 5%. There is also dramatic change in skew and, for large values of delta, the volatility is increased by 15% to 20% or more. Merely shifting the entire surface upwards would either introduce too much volatility for low values of delta or provide insufficient volatility at high levels of delta. However, according to the present technique, the change in skew can be accurately represented by increasing the value of the corresponding beta parameter(s) in the surface model prior to using the model to derive the volatility during simulation. In the example of Equs. 3 and 4, above, the skew is dependent on the value of $\beta_1$ and by increasing this value by an additional $\beta_{1,stress}$, a change in skew can be introduced.

Figure 8:
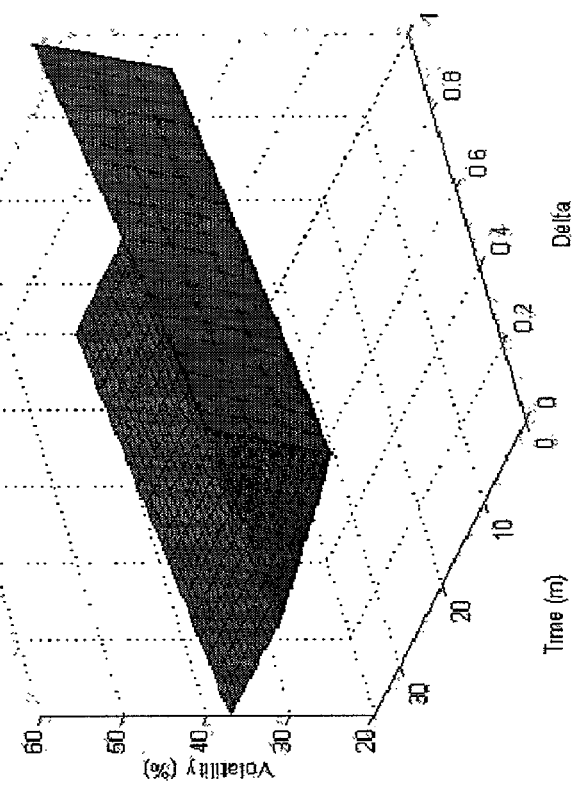
Figure 8:
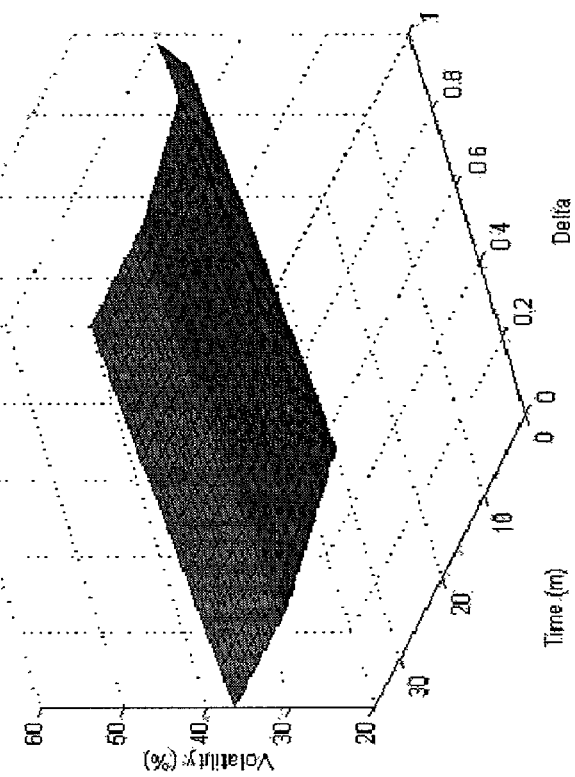

FIG. 8 is an illustration of an implied volatility surface for IBM options before and after the unusual market event occurring in the Spring of 2000. With reference to the two surfaces shown in FIG. 8, it can be seen that the average volatility offset and the skew remain relatively constant. However, there is a large increase in the volatility of short-term options. Thus, the market event caused short term uncertainty but had very little effect on the long-term view of the market towards options in IBM. An increase in the short-term volatility such as this can be modeled, with reference to Equ. 4, for example, by adding a stress factor to the $\beta_2$ parameter.

A variety of other stress variations on the volatility surface can also occur in which various attributes of the volatility surface are varied, singly or in combination. For example, FIG. 9 shows the volatility surfaces for options on Cisco Systems before and after an event during the Spring of 2000. In addition to a generally upward shift in the volatility surface by about 12%, there is also a change in skew, providing a greater change in implied volatility for options with large deltas as well as a substantial increase in short term volatility. Each of these volatility attributes can be accurately modeled by adding stress offsets to the beta values for the surface parameter models during the simulation process.

Various techniques can be used to select the appropriate values of stress levels to be introduced so as to achieve the desired change in the volatility surface. The manner in which to implement these techniques will be known to those of skill in the art, with reference to the present disclosure.

In one technique, the values can be selected manually based on the experience and analysis of the individual doing the simulation. In another technique, the historic volatility surfaces during unusual market conditions can be compared with one or more surfaces during normal conditions. The differences between the historic normal and unusual surfaces can then be analyzed to determine the stress values that would need to be used in the surface model so as to produce the unusual market surface starting from a given normal market volatility surface. The determined stress values can then be stored for use as needed. For example, the determined stress values can be stored in a table or matrix from which selections of stress values can be made to simulate historical market events or simulate events selected. The selection can be done with reference to the historical event at issue, randomly, or otherwise. In addition, the determined stress values can be combined and varied, such as randomly, to produce "realistic" but non-historic market events during simulation. In a particular embodiment, the stress values are calculated and made available for use during simulation using processes similar to those discussed above with respect to historical bootstrapping to determine the normal beta parameters. Other ways to generate appropriate stress values for use during simulation can also be used.

The present invention can be implemented using various techniques. A preferred method of implementation uses a set of appropriate software routines which are configured to perform the various method steps on a high-power computing platform. The input data, and the generated intermediate values, simulated risk factors, priced instruments, and portfolio matrices can be stored in an appropriate data storage area, which can include both short-term memory and long-term storage, for subsequent use. Appropriate programming techniques will be known to those of skill in the art and the particular techniques used depend upon implementation details, such as the specific computing and operating system at issue and the anticipated volume of processing. In a particular implementation, a Sun OS computing system is used. The various steps of the simulation method are implemented as C++ classes and the intermediate data and various matrices are stored using conventional file and database storage techniques.

While the invention has been particularly shown and described with reference to preferred embodiments thereof, it will be understood by those skilled in the art that various changes in form and details can be made without departing from the spirit and scope of the invention.

The invention claimed is:

1. A processor-implemented method for simulating the behavior of a financial instrument, which is an option on an underlying financial instrument, in response to unusual market conditions comprising:

providing a volatility surface model representing implied volatility for the option relative to $\Delta$ and T values to be used during simulation of the instrument's behavior, the surface model defining a volatility surface using a plurality of surface parameters $\beta_0, \ldots, \beta_n$, $n \geq 0$, each surface parameter being associated with at least one attribute of the modeled volatility surface, the surface model having a form $$\sigma(\Delta, T) = F(\beta_0, \ldots, \beta_n, \Delta, T)$$

where (i) $\sigma$ is a measure of the volatility for an option with a given $\Delta$, which is a ratio of a change in option price to a change in security price and T, which is a term remaining for the option and (ii) F is a function of $\Delta$, T and the surface parameters $\beta_0, \ldots, \beta_n$;

determining values for surface parameters $\beta_{0,normal}, \ldots, \beta_{n,normal}$ under normal market conditions;

adjusting at least one of the determined normal surface values $\beta_{x,normal}$ by a respective stress value $\beta_{x,stress}$, $0 \leq x \leq n$;

generating via a processor a volatility surface based on the provided volatility surface model and a set of the determined normal surface parameter values with the adjustment by the stress value; and extracting a volatility from the generated volatility surface;

wherein the plurality of surface parameters comprise at least one surface parameter associated with an offset of the volatility surface relative to the $\Delta$ and T axes, at least one surface parameter associated with changes in the volatility surface with respect to the $\Delta$ of the option, and at least one surface parameter associated with changes in the volatility surface with respect to the term of the option;

wherein the extracted volatility is used in a pricing model to provide a price of the particular instrument.

2. The method of claim 1, wherein the surface model is of the form:

$$\ln \sigma(\Delta, t) = \beta_0 + \beta_1(\Delta - x_1) + \beta_2(T - x_2)^+ + \beta_3(T - x_3)^+$$

where $x_1$, $x_2$, and $x_3$ are constant terms.

3. The method of claim 2, wherein $x_1$, $x_2$, and $x_3$ are substantially equal to 0.5, 4.0, and 24 respectively.

4. The method of claim 1, further comprising:

providing a set of historical volatilities for a plurality of options on the underlying financial instrument;

analyzing the set of historical volatilities to determine initial values $\beta_{0,initial,normal}, \ldots, \beta_{n,initial,normal}$ for the surface parameters which, when used in the surface model, define a surface approximating the set of volatilities under normal market conditions; and determining an evolved value for each surface parameter in accordance with a beta evolution function.

5. The method of claim 4, further comprising:

generating an initial volatility surface based on the provided surface model and the determined initial parameter values $\beta_{0,initial,normal}, \ldots, \beta_{n,initial,normal}$;

generating calibration data representing offsets between at least some of the volatilities in the provided set of historical volatilities and at least some of the volatilities on the generated initial volatility surface; and adjusting the extracted volatility in accordance with the calibration data.

6. The method of claim 4, further comprising: determining a sequence of time-evolving surface parameter values based on the beta evolution function for the at least one surface parameter under normal market conditions.

7. The method of claim 4, wherein the beta evolution function for a respective surface parameter $\beta_m$ is of the form:

$$\Delta \beta_{m,i} = \alpha_m(\theta_m \beta_{m,i-1}) + \upsilon_m \epsilon_{m,i}$$

where i is a time index, $\alpha_m$ is a mean-reversion speed, $\theta_m$ is a mean-value, and $\upsilon_m$ is a volatility of $\beta_m$, and $\epsilon_m$, is a noise term.

8. A system for simulating the behavior of a financial instrument which is an option on an underlying financial instrument, in response to unusual market conditions comprising:

a computer having a processor and at least one data store;

the data store containing therein at least:

a volatility surface model representing implied volatility for the option relative to $\Delta$ and T values to be used during simulation of the instrument's behavior, the surface model defining a volatility surface using a plurality of surface parameters $\beta_0, \ldots, \beta_n$, $n \geq 0$, each surface parameter being associated with at least one attribute of the modeled volatility surface, the surface model having a form $$\sigma(\Delta, T) = F(\beta_0, \ldots, \beta_n, \Delta, T)$$

where (i) $\sigma$ is a measure of the volatility for an option with a given $\Delta$, which is a ratio of a change in option price to a change in security price and T, which is a term remaining for the option and (ii) F is a function of $\Delta$, T and the surface parameters $\beta_0, \ldots, \beta_n$;

the processor being configured via computer software to:
determine a value for surface parameters $\beta_{0,normal}$, $\beta_{n,normal}$ for a step of the simulation under normal market conditions;
adjust at least one of the determined normal surface values $\beta_{x,normal}$ by a respective stress value $\beta_{x,stress}$, $0 \leq x \leq n$;
generate a volatility surface based on the provided volatility surface model and a set of the determined normal surface parameter values with the adjustment by the stress value and
extract a volatility from a volatility surface defined by surface model;
wherein the plurality of surface parameters comprise at least one surface parameter associated with an offset of the volatility surface relative to the $\Delta$ and T axes, at least one surface parameter associated with changes in the volatility surface with respect to the $\Delta$ of the option, and at least one surface parameter associated with changes in the volatility surface with respect to the term of the option;
wherein the extracted volatility can be used in a pricing model to provide a price of the particular instrument.

9. The system of claim 8, wherein the surface model is of the form:

$$\ln \sigma(\Delta, T) = \beta_0 + \beta_1(\Delta - x_1) + \beta_2(T - x_2)^+ + \beta_3(T - x_3)^+$$

where $x_1$, $x_2$, and $x_3$ are constant terms.

10. The system of claim 9, wherein $x_1$, $x_2$, and $x_3$ are substantially equal to 0.5, 4.0, and 24 respectively.

11. The system of claim 8, wherein the data store further comprises data representing a set of volatilities for a plurality of options on the underlying financial instrument;
the processor being further configured to:
provide a set of historical volatilities for a plurality of options on the underlying financial instrument;
analyze the set of historical volatilities to determine initial values $\beta_{0,initial,normal}, \ldots, \beta_{n,initial,normal}$ for the surface parameters which, when used in the surface model, define a surface approximating the set of volatilities under normal market conditions; and
determine an evolved value for each surface parameter in accordance with a beta evolution function.

12. The system of claim 11, wherein the processor is further configured to:
generate an initial volatility surface based on the provided surface model and the determined initial parameter values $\beta_{0,initial,normal}, \ldots, \beta_{n,initial,normal}$;
generate calibration data representing offsets between at least some of the volatilities in the provided set of historical volatilities and at least some of the volatilities on the generated initial volatility surface; and
adjust the extracted volatility in accordance with the calibration data.

13. The system of claim 11, wherein the processor is further configured to determine a sequence of time-evolving surface parameter values based on the beta evolution function for the at least one surface parameter under normal market condition and store the sequence of values in the data store.

14. The system of claim 11, wherein the beta evolution function for a respective surface parameter $\beta_m$ is of the form:

$$\Delta \beta_{m,i} = \alpha_m(\theta_m - \beta_{m,i-1})^+ \upsilon_m \epsilon_{m,i}$$

where i is a time index, $\alpha_m$ is a mean-reversion speed, $\theta_m$ is a mean-value, and $\upsilon_m$ is a volatility of $\upsilon_m$, and $\epsilon_{m,i}$ is a noise term.

\* \* \* \* \*